US007898526B2

(12) United States Patent
Ladouceur et al.

(10) Patent No.: US 7,898,526 B2
(45) Date of Patent: Mar. 1, 2011

(54) HAPTIC KEYPAD AND ELECTRONIC DEVICE

(75) Inventors: Norman M. Ladouceur, Waterloo (CA); Jason T. Griffin, Kitchener (CA); Steven H. Fyke, Waterloo (CA); Roman P. Rak, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 928 days.

(21) Appl. No.: 11/749,346

(22) Filed: May 16, 2007

(65) Prior Publication Data

US 2007/0268260 A1 Nov. 22, 2007

Related U.S. Application Data

(60) Provisional application No. 60/800,669, filed on May 16, 2006.

(51) Int. Cl.
*G09G 5/00* (2006.01)
*G06F 3/02* (2006.01)

(52) U.S. Cl. ...................... 345/168; 400/427

(58) Field of Classification Search ............... 345/156, 345/168, 169; 200/345; 434/112–117; 400/472, 400/483, 486, 487, 489; 361/679.11–679.17; 455/575.1

See application file for complete search history.

(56) References Cited

U.S. PATENT DOCUMENTS

| 4,940,346 | A | * | 7/1990 | Liljenquist | 400/487 |
| 5,408,060 | A | * | 4/1995 | Muurinen | 200/314 |
| 5,510,782 | A | * | 4/1996 | Norris et al. | 341/22 |
| 6,259,049 | B1 | * | 7/2001 | Nakai | 200/341 |
| D454,849 | S | * | 3/2002 | Eckholm | D14/138 AA |
| 2002/0011689 | A1 | * | 1/2002 | Chi et al. | 264/219 |
| 2003/0209416 | A1 | * | 11/2003 | Tsai | 200/341 |
| 2006/0146026 | A1 | * | 7/2006 | Shim | 345/168 |

FOREIGN PATENT DOCUMENTS

WO 01/50608 A1 7/2001

* cited by examiner

*Primary Examiner*—Amr Awad
*Assistant Examiner*—Stephen G Sherman
(74) *Attorney, Agent, or Firm*—Alexander Anishchenko; Borden Ladner Gervais LLP

(57) ABSTRACT

An improved handheld electronic device includes an improved keypad with keys that impart a plurality of different instances of a given physical property. In one embodiment, each key imparts of plurality of different instances of the given physical property, such as by forming each key of a plurality of materials. In another embodiment, each key includes only a single instance of a given physical property, but different keys posses different instances of the same physical property, i.e., certain keys may be formed of a first material, and other keys may be formed of a second, different material.

22 Claims, 4 Drawing Sheets

HAPTIC KEYPAD AND ELECTRONIC DEVICE

CROSS-REFERENCE TO RELATED APPLICATION

The instant application claims priority from U.S. Provisional Patent Application Ser. No. 60/800,669 filed May 16, 2006, the disclosures of which are incorporated herein by reference.

BACKGROUND

1. Field

The disclosed and claimed concept relates generally to handheld electronic devices and, more particularly, to a keypad of a handheld electronic device.

2. Description of the Related Art

Numerous types of handheld electronic devices are known. Examples of such handheld electronic devices include, for instance, personal data assistants (PDAs), handheld computers, two-way pagers, cellular telephones, and the like. Many handheld electronic devices also feature wireless communication capability, although many such handheld electronic devices are stand-alone devices that are functional without communication with other devices.

As is generally understood in the relevant art, users of handheld electronic devices typically are able to direct at most only a limited amount of attention toward operation of a handheld electronic device since the user oftentimes is involved in other activities, hence the portable nature of handheld electronic devices. As such, any improvement which reduces the extent to which a user must direct attention to a handheld electronic device in order to operate the device is beneficial. Keypads of handheld electronic devices oftentimes are operable only if a user directs a substantial amount of attention to the keypad. It thus would be desired to provide an improved keypad and handheld electronic device wherein the keypad is operable with a reduced amount of direct attention, i.e., visual attention, by a user.

BRIEF DESCRIPTION OF THE DRAWINGS

A full understanding of the disclosed and claimed concept can be obtained from the following Description when read in conjunction with the accompanying drawings in which:

Similar numerals refer to similar parts throughout the specification.

DESCRIPTION

Figure 1:
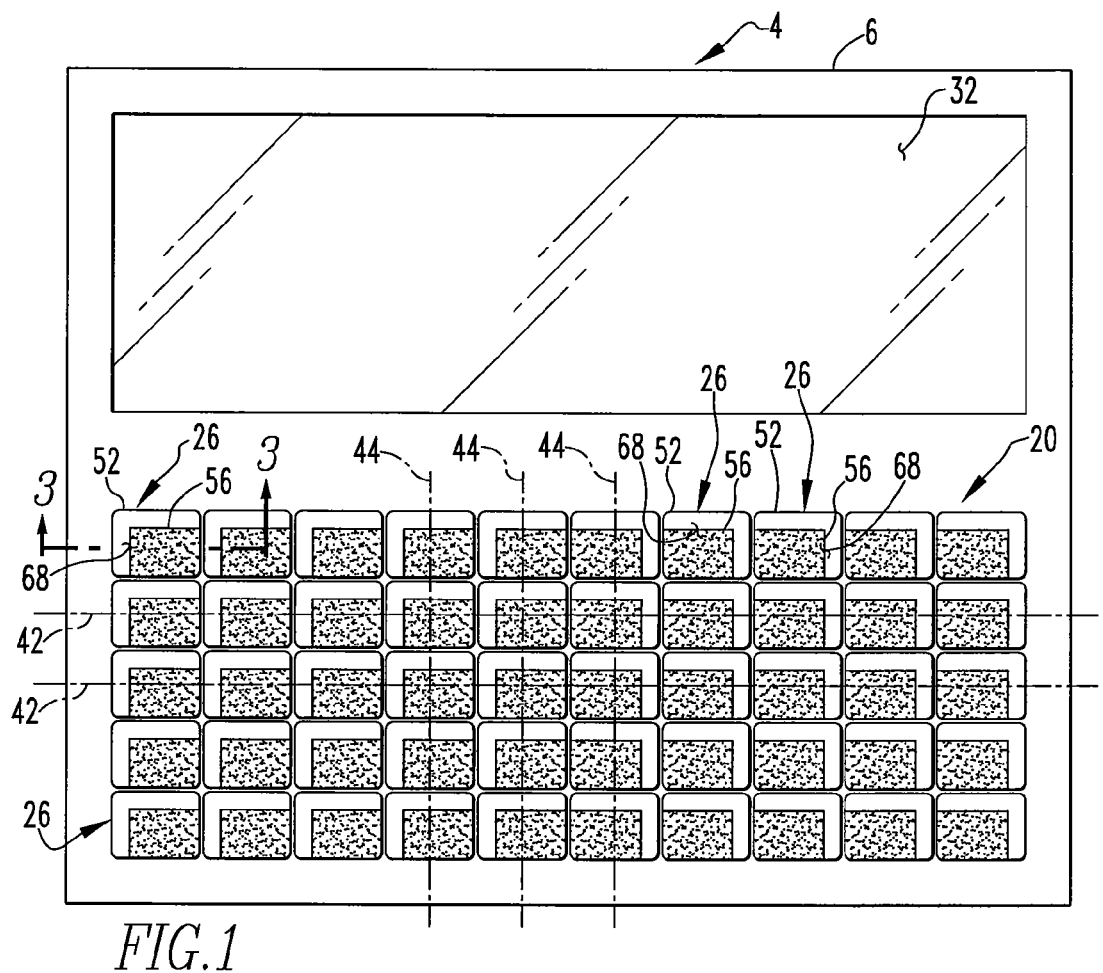
FIG. 1 is a front elevational view of an exemplary handheld electronic device in accordance with a first embodiment of the disclosed and claimed concept.
Figure 2:
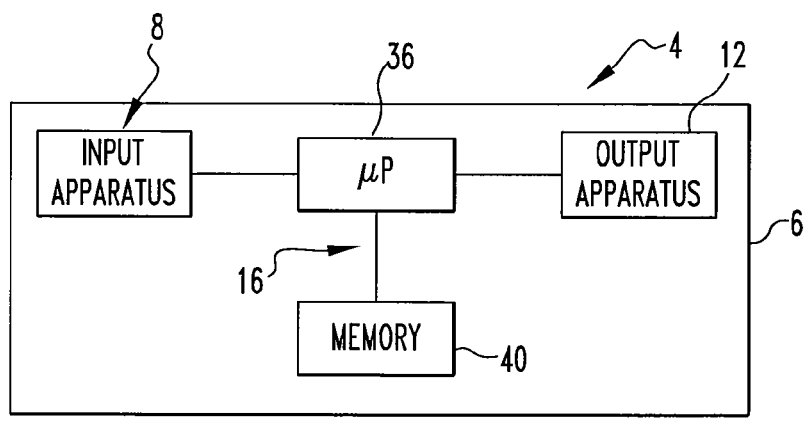
FIG. 2 is a schematic depiction of the handheld electronic device of FIG. 1.

An improved handheld electronic device 4 in accordance with the disclosed and claimed concept is indicated generally in FIG. 1 and is depicted schematically in FIG. 2. The improved handheld electronic device 4 comprises a housing 6 upon which are disposed an input apparatus 8, an output apparatus 12, and a processor apparatus 16. The input apparatus 8 provides input to the processor apparatus 16. The processor apparatus 16 provides output signals to the output apparatus 12. The exemplary output apparatus 12 comprises a display 32.

The input apparatus 8 comprises a keypad 20 having a plurality of keys 26 that are each actuatable to provide input to the processor apparatus 16. As will be set forth in greater detail below, the keypad 20 is advantageously configured to be haptically detectable, i.e., tactually detectable, by a user. Examples of other input devices not expressly depicted herein would include, for instance, a mouse, touch pad, trackball, or track wheel for providing navigational inputs, such as could be reflected by movement of a cursor on the display 32, and other inputs such as selection inputs.

The processor apparatus 16 comprises a processor 36 and a memory 40. The processor 36 may be, for example and without limitation, a microprocessor (μP) that interfaces with the memory 40. The memory 40 can be any one or more of a variety of types of internal and/or external storage media such as, without limitation, RAM, ROM, EPROM(s), EEPROM(s), FLASH, and the like that provide a storage register for data storage such as in the fashion of an internal storage area of a computer, and can be volatile memory or nonvolatile memory. The memory 40 has stored therein a number of routines that are executable on the processor 36. As employed herein, the expression "a number of" and variations thereof shall refer broadly to a nonzero quantity, including a quantity of one.

As can be seen from FIG. 1, the keys 26 of the keypad 20 are arranged in a plurality of rows 42 and a plurality of columns 44. The expressions "row" and "column" and variations thereof shall broadly to pluralities of keys 26 that are disposed sequentially adjacent one another, whether such plurality of such keys 26 are aligned with one another along a straight line or along an arcuate line.

In accordance with the disclosed and claimed concept, the keypad 20 is configured to enable a user to tactually distinguish the rows 42 and columns 44 of keys 26 from adjacent rows 42 and columns 44 of keys. Specifically, all of the keys 26 can be said to possess a particular physical property, i.e., the material out of which the key 26 is formed, the coefficient of friction of an outer surface of a key 26, and/or a texture of an outer surface of a key 26, and for any given physical property, each key 26 can be said to possess a plurality of instances of such a property that are different than one another. For instance, each of the keys 26 comprise a key body 48 that includes a first key portion 52 formed out a first material and a second key portion 56 formed out of a second material different than the first material. As such, and by way of example, when the material out of which a key 26 is formed is the "physical property" under consideration, each key 26 is formed out of a plurality of different materials. In a similar fashion, each key 26 could alternatively or additionally include a plurality of coefficients of friction on an outer surface thereof and/or a plurality of different textures on an outer surface thereof.

Figure 3:
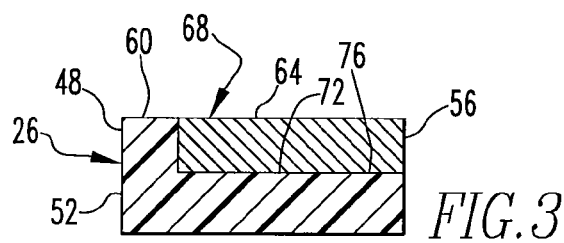
FIG. 3 is a sectional view as taken along line 3-3 of FIG. 1.

The first key portion 52 possesses a first surface portion 60, and the second key portion 56 possesses a second surface portion 64, with the first and second surface portions 60 and 64 each being engageable by a user to actuate the key 26. The first and second surface portions 60 and 64 together form an outer surface 68 of the key 26 that can likewise be said to be engageable by a user to actuate the key 26. In the exemplary embodiment depicted in FIGS. 1 and 3, the first surface portion 60 is in the shape of an inverted L, and the second surface portion 64 is rectangular and is disposed in the open region of the first surface portion 60. The exemplary first and second surface portions 60 and 64 are disposed adjacent one another, with the first surface portion 60 at least partially surrounding the second surface portion 64. As is best shown in FIG. 3, the first and second surface portions 60 and 64 are flush with one another and are together of a coplanar arrangement thus giving the outer surface 68 a planar configuration.

The key bodies 48 can be configured in any of a variety of fashions to enable the first and second key portions 52 and 56 to be formed out of different materials, for example, in order to impart to each key 26 the plurality of different instances of a given physical property. In the exemplary key 26 depicted in FIG. 3, the key body 48 is in large part formed out of the first material, with the first key portion 52 having a receptacle 72 formed therein within which the second key portion 56 is disposed. Specifically, the first key portion 52 has a shelf 76 adjacent the receptacle 72 upon which the second key portion 56 is disposed. Other configurations will be apparent.

By forming each key 26 out of a plurality of different materials, for example, a user is enabled to tactually distinguish one column 44 of keys 26 from an adjacent column 44, and can distinguish one row 42 of keys 26 from an adjacent row 42. This is because the first and second surface portions 60 and 64 of any given key 26 provide tactile sensations different from one another to a user touching the outer surface 68. In the exemplary keys 26 described herein, the first key portion 52 is formed out of a nonmetallic material, i.e., a plastic or rubber material, for instance, which would operate as a thermal insulator. The second key portion 56 is formed out of a metallic material, which would serve as a thermal conductor relative to the first key portion 52. If the key 26 is at a temperature lower than the body temperature of a user touching the outer surface 68, the second key portion 56, being a thermal conductor and thus having a higher rate of heat transfer away from the user than the first key portion 52, will operate as a heat sink and will be perceived by the user as being colder to the touch than the first key portion 52. That is, since the second key portion 56 is formed of a material having a greater coefficient of thermal conductivity than the material out of which the first key portion 52 is formed, the second key portion 56 will operate, relative to the first key portion 52, as a heat sink and will therefore feel colder to the touch than the first key portion 52 when the key 26 is at a temperature below the body temperature of the user engaging the outer surface 68 of the key 26. As such, as to any given physical property, such as the material out of which a key 26 is formed, each of the keys 26 in FIG. 1 possess a plurality of different instances of the same physical property, i.e., each of the keys 26 is formed out of a plurality of different materials.

Other physical properties, such as mentioned above, can provide alternate and/or additional benefits. For instance, the first and second surface portions 60 and 64 could have different coefficients of friction. Such different coefficients of friction could be provided inherently by forming the first and second key portions 52 and 56 out of different materials, or alternatively could be provided by forming the first and second key portions 52 and 56 out of the same or similar materials that have been processed in different ways, for example.

In the example of the keys depicted in FIG. 1, the two different materials out of which the first and second key portions 52 and 56 are formed can provide different coefficients of friction at the first and second surfaces 60 and 64. It is understood that the expression "coefficient of friction" and variations thereof shall refer broadly to static and/or dynamic coefficients of friction. If the nonmetallic material out of which the first key portion 52 is formed is, for example, an elastomeric material having a rubbery feel, and if the second key portion 56 is formed out of a metal, the first surface portion 60 will inherently have a higher friction feel than the second surface portion 64 due to the different coefficients of friction of the two materials. Thus, the first and second surface portions 60 and 64 will provide different thermal sensations to a user by virtue of the fact that the first key portion 52 is formed out of a thermal insulator and the second key portion 56 is formed out of a thermal conductor, and the first and second surface portions 60 and 64 will additionally provide different frictional sensations to a user by virtue of the fact that the two materials out of which the first and second key portions 52 and 56 are formed have different coefficients of friction.

Similarly, the first and second surface portions 60 and 64 could have different textures. For instance, the first surface portion 60 could be relatively roughened, and the second surface portion 64 could be relatively smooth. Such a situation could be achieved even if the first and second key portions 52 and 56 were formed out of the same material. Furthermore, such a result could be achieved if the first and second key portions 52 and 56 were distinguished from one another merely due to different surface treatments applied to the first and second surface portions 60 and 64.

It is further noted that the first and second key portions 52 and 56 could be formed out of materials having different Durometer hardnesses which potentially could provide different physical properties that could be tactually detected by a user. Other types of different treatments to the first and second key portions 52 and 56 and/or to the first and second surface portions 60 and 64 will be apparent.

In the exemplary keypad 20 of FIG. 1, the open regions of the inverted L-shaped first key portions 52 that are disposed on one side of the keypad 20 are facing and are opposed to the open regions of the L-shaped first key portions 52 that are disposed on the other side of the keypad 20. The vertical legs of the L-shaped first key portions 52 allow a user to distinguish one key 26 from a key 26 horizontally adjacent thereto because the tactile sensation provided to the user by the vertical leg are different than the tactile sensations provided to the user by the adjacent second key portion 56 of the horizontally adjacent key 26. In a similar fashion the horizontal legs of the L-shaped first key portions 52 allow a user to distinguish one key 26 from another key 26 vertically adjacent thereto. By the user perceiving the different tactile properties of the various portions of the keys 26, the user can touch navigate throughout the keypad 20 to a specific location thereof.

Figures 4A, 4B, 4C, 4D:
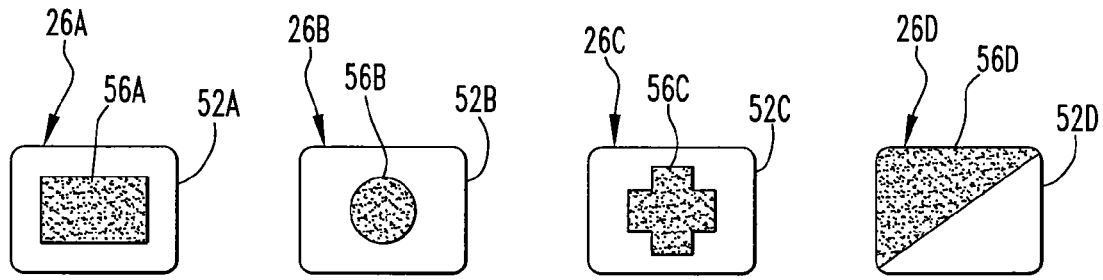
FIG. 4A is an exemplary alternative key configuration that can be implemented into the handheld electronic device of FIG. 1.
FIG. 4B is another exemplary alternative key configuration that can be implemented into the handheld electronic device of FIG. 1.
FIG. 4C is another exemplary alternative key configuration that can be implemented into the handheld electronic device of FIG. 1.
FIG. 4D is another exemplary alternative key configuration that can be implemented into the handheld electronic device of FIG. 1.

FIGS. 4A, 4B, 4C, and 4D depict exemplary configurations of alternate keys 26A, 26B, 26C, and 26D, respectively, that could be variously implemented in the keypad 20 of FIG. 1. In FIG. 4A, the first key portion 52A completely surrounds the second key portion 56A, with the second key portion 56A being of a rectangular configuration. In FIG. 4B, the first key portion 52B completely surrounds the second key portion 56B, but the second key portion 56 is of a circular configuration. In FIG. 4C, the first key portion 52C completely surrounds the second key portion 56C, with the second key portion 56C being in the shape of a plus sign, i.e. "+". In FIG. 4D, the first and second key portions 52D and 56D are disposed adjacent one another and share a diagonal juncture extending between diagonally opposed corners of the key 26D. Numerous other types of key configurations will be apparent. Moreover, any one or more of the alternate keys 26A, 26B, 26C, and/or 26D or other keys could be implemented into the keypad 20 of FIG. 1 in any suitable combination.

Figure 5:
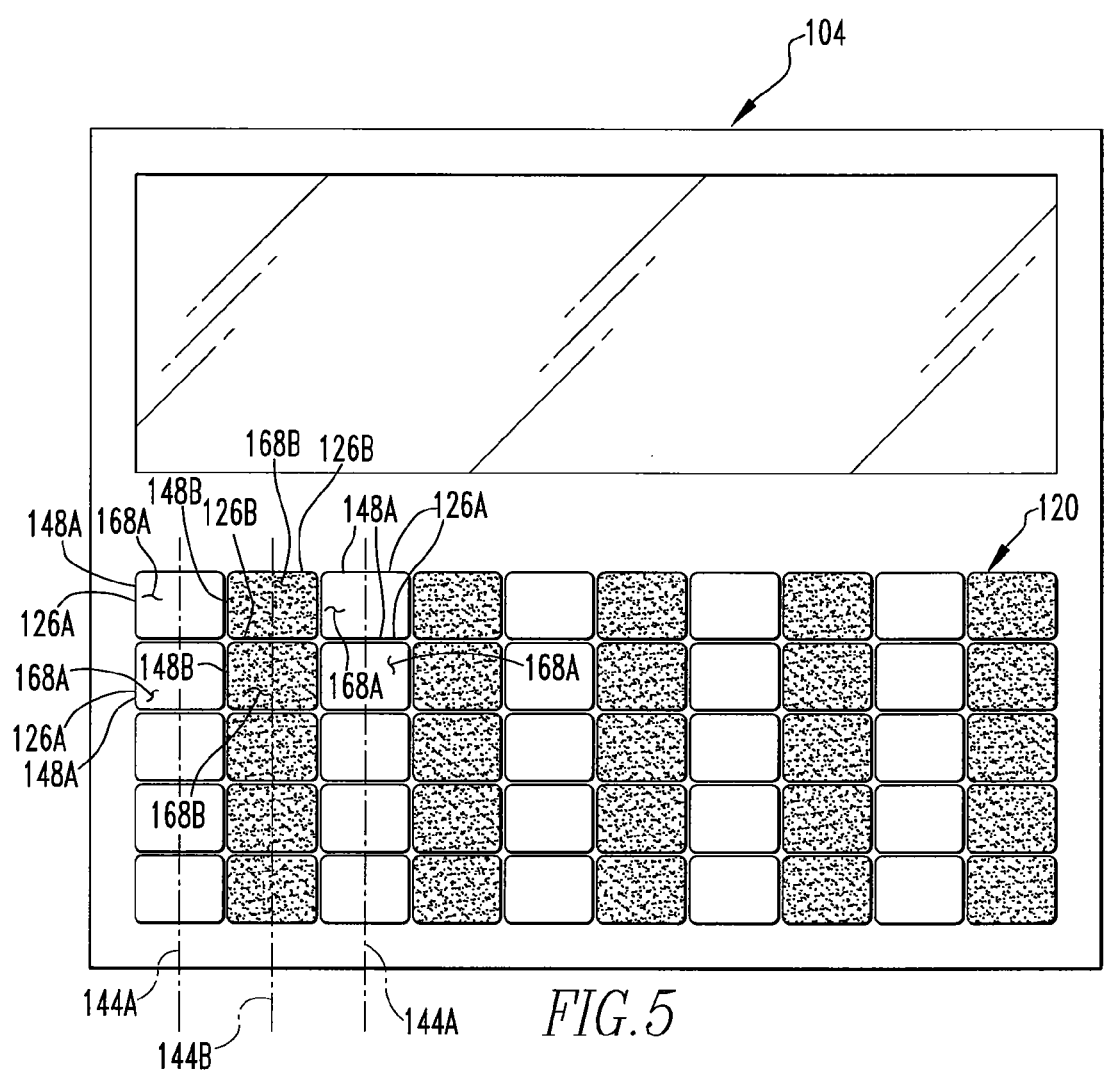
FIG. 5 is a front elevational view of an exemplary handheld electronic device in accordance with a second embodiment of the disclosed and claimed concept.

Another embodiment of a handheld electronic device 104 in accordance with the disclosed and claimed concept is depicted generally in FIG. 5. The handheld electronic device 104 is similar to the handheld electronic device 4, except that the keypad 120 of FIG. 5 can be said to itself possess a plurality of instances of a given physical property, with any given key 126 having only a single instance of such physical property. For example, the exemplary keypad 120 has keys 126A and 126B, with the keys 126A being arranged in columns 144A, and with the keys 126B being arranged in columns 144B. The columns 144A alternate with the columns 144B. The keys 126A each include a key body 148A formed of a first material. The keys 126D each have a key body 148D formed out of a second material different than the first material.

In the exemplary keypad 120, the keys 126A are formed out of a nonmetallic material, i.e., a thermal insulator, while the keys 126B are formed out of a metallic material, i.e., a thermal conductor. If the temperature of the keys 126A and 126B are below the body temperature of a user engaging the keys 126A and 126B, the keys 126B will provide a greater rate of heat transfer from the user and thus will each operate as a heat sink relative to the keys 126A and accordingly will feel colder to the touch than the keys 126A.

Similarly, the outer surfaces 168A can additionally or alternatively have a different coefficient of friction and/or a different texture than the outer surfaces 168B. As mentioned above, such disparate instances of physical properties can result from different materials being used to form the key bodies 148A and 148B, for example, or can result from the same or similar materials being processed in different ways, for example, and/or can result from different treatments performed to the outer surfaces 168A and 168B, for example.

It is understood that the keys 126A and 126B of the handheld electronic device 104 could be of other arrangements without departing from the present concept. For instance, certain groups of keys could be formed out of different materials, while other groups of keys could be configured to have different surface textures. Other arrangements will be apparent.

It thus can be seen that by advantageously configuring the keys 26 of the keypad 20 to each have a plurality of different instances of a given physical property, and/or by configuring the keypad 120 as a whole to have a plurality of different instances of a given physical property, operation of the handheld electronic devices 4 and 104 is facilitated by requiring less visual attention from the user. The exemplary physical property illustrated herein as providing a plurality of tactually detectable sensations is the material or materials out of which the keys 26 and 126 are formed. For instance, the exemplary keys 26 each possess a plurality of different instances of the physical property of the materials out of which the keys 26 are formed. Such different materials can impart to each such key 26 pluralities of different thermal, frictional, and/or textural features, all of which can be haptically, i.e., tactually, detected by a user engaging any such key 26. The keypad 120 provides the same features, except on more of a macroscopic level, i.e., an individual key 126A or 126B can be configured to have only a single instance of a given physical property, but adjacent pairs or other pairs of keys 126A and 126B possess different instances of the same physical property.

Figure 6:
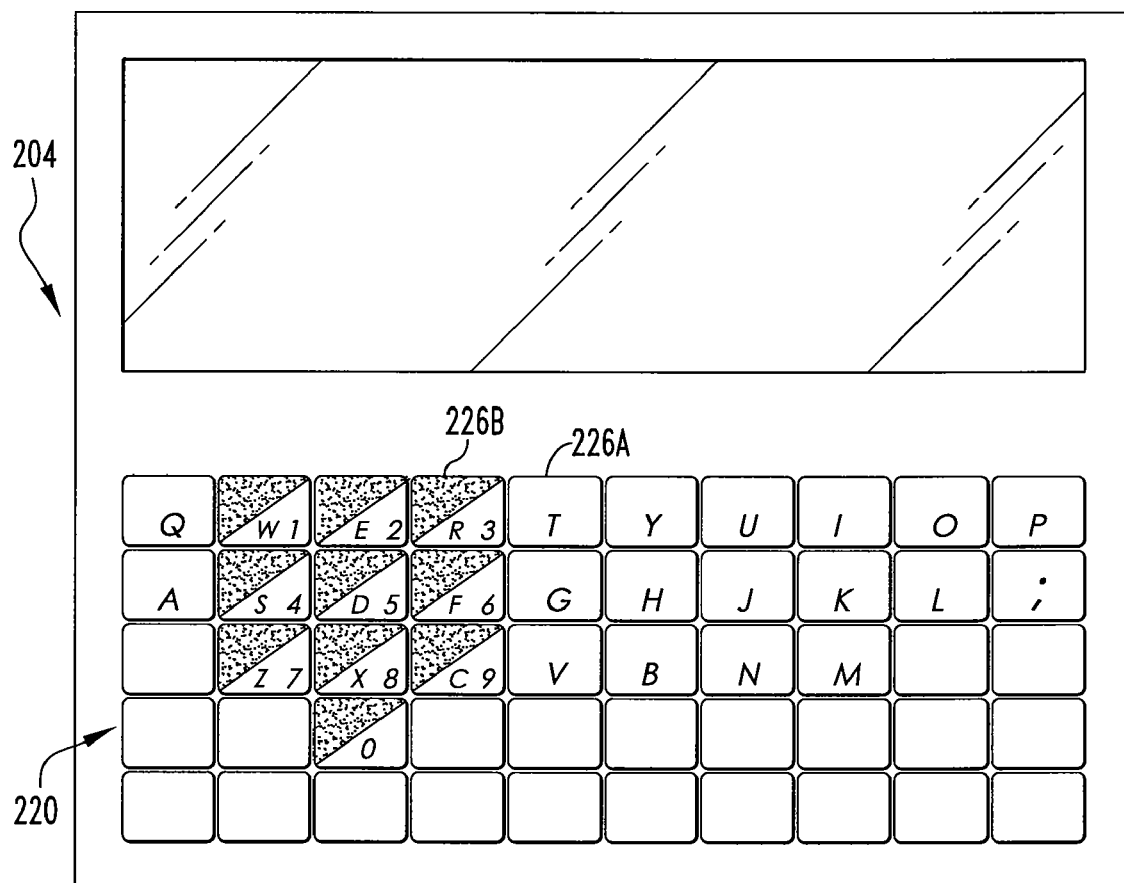
FIG. 6 is a front elevational view of an exemplary handheld electronic device in accordance with a third embodiment of the disclosed and claimed concept.

A third embodiment of an improved handheld electronic device 204 in accordance with the disclosed and claimed concept is depicted generally in FIG. 6. The handheld electronic device 204 has a keypad 220 that is in the exemplary form of an enhanced QWERTY keyboard having a telephone pad incorporated therein. During execution of a telephone user interface routine on the processor apparatus of the handheld electronic device 204, actuation of the keys of the telephone pad result in the generation of DTMF telephone signals which can initiate a telephone call.

The keypad 220 comprises the keys 226A and the keys 226B, with the keys 226A generally each having only a single instance of a particular physical property, and with the keys 226B having a plurality of different instances of the physical property. Each of the keys 226B has assigned thereto a digit of a conventional touch-tone telephone pad. The keys 226B are of a configuration similar to the keys 26D in FIG. 4D, although it is understood that any key configuration could be provided. The keys 226B thus advantageously distinguish the telephone pad portion of the keypad 220 from the other portions of the keypad 220, and also enable a person to touch navigate within the telephone pad portion, i.e., among the keys 226B, with minimal visual attention being required.

Figure 7:
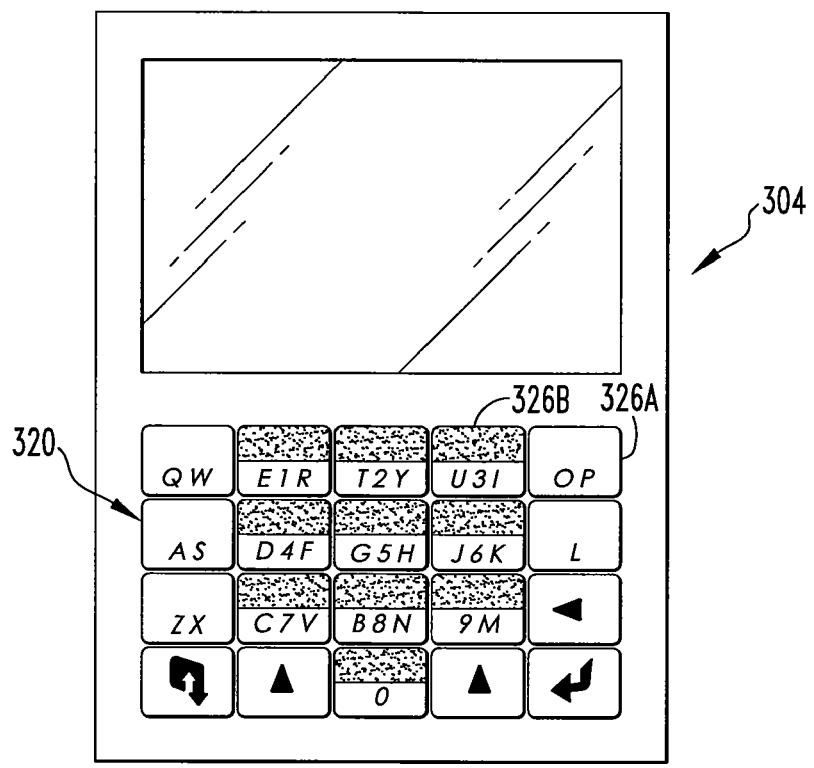
FIG. 7 is a front elevational view of an exemplary handheld electronic device in accordance with a fourth embodiment of the disclosed and claimed concept.

An improved handheld electronic device 304 in accordance with a fourth embodiment of the disclosed and claimed concept is depicted generally in FIG. 7. The exemplary keypad 320 of the handheld electronic device 304 is in the form of a reduced QWERTY keyboard having a telephone pad incorporated therein. The handheld electronic device 304 might have any of a variety of text input routines operable thereon, such as a disambiguation routine, a multi-tap routine, or other input routine which interprets actuations of keys into text input. The handheld electronic device 304 also has a telephone user interface routine executable thereon.

The keypad 320 includes the keys 326A and 326B, with the keys 326B each having assigned thereto a digit in accordance with a conventional touch-tone telephone layout. Each of the keys 326B has a plurality of different instances of a given physical property whereas the keys 326A each have only a single instance of the given physical property. The keys 326B each have an outer surface on which an upper half provides one type of tactually detectable property, and wherein a lower half provides a different tactually detectable property. Other key configurations can be employed. The plurality of different instances of the given physical property possessed by the keys 326B distinguishes the telephone pad portion of the keypad 320 from the other portions of the keypad 320, and additionally enables a user to touch navigate among the keys 326B with minimal visual attention required of the user.

Figure 8:
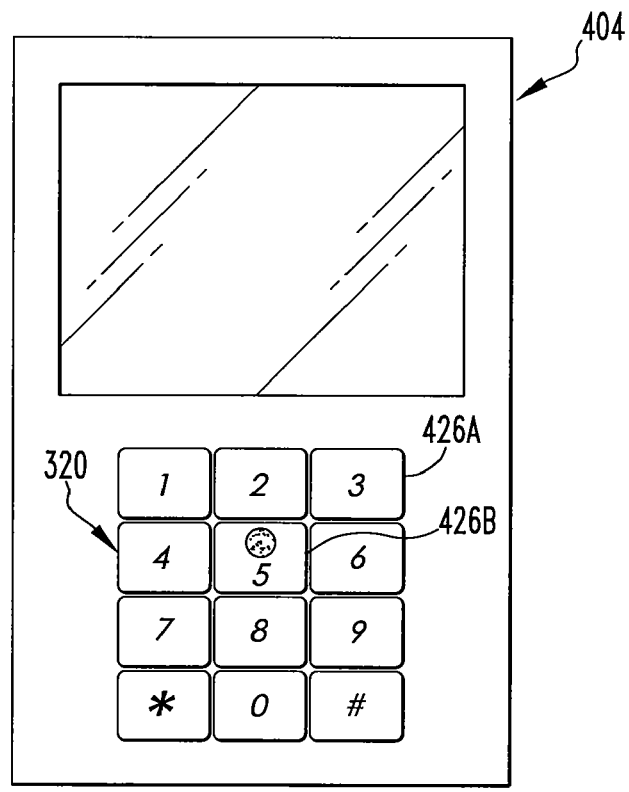
FIG. 8 is a front elevational view of an exemplary handheld electronic device in accordance with a fifth embodiment of the disclosed and claimed concept.

An improved handheld electronic device 404 in accordance with a fifth embodiment of the disclosed and claimed concept is depicted generally in FIG. 8. The exemplary handheld electronic device 404 includes a keypad 420 that is in the form of a touch-touch telephone pad. It can be seen that the keypad 420 includes a single key 426B and a plurality of keys 426A. Each of the keys 426A has a single instance of a given physical property, and the key 426B has a plurality of different instances of the physical property. The exemplary key 426B is similar to the key 26B depicted generally in FIG. 4B, although it is understood that other configurations can be employed without departing from present concept. The plurality of instances of a physical property provided by the key 426B facilitates the user finding the "5" key of the telephone pad within the keypad 420, thereby enabling the user to touch navigate to the other keys 426A from the key 426B with minimal visual attention being required of the user.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. An electronic device comprising:
   a number of keys arranged in a first group and a second group, at least some of the keys in the first group each comprising:
      a key body comprising a first key portion, a second key portion, and an outer surface;
      the first key portion having a first surface portion, the first surface portion having a first group first tactual characteristic;
      the second key portion having a second surface portion, the second surface portion being substantially flush with the first surface portion and having a first group second tactual characteristic, the first group second tactual characteristic being tactually distinguishable from the first group first tactual characteristic;
      the outer surface comprising the first surface portion and the second surface portion;
      at least a portion of the first key portion being formed of a first material; and
      at least a portion of the second key portion being formed of a second material different than the first material;
   at least one key of the second group having at least one second group tactual characteristic, the at least one second group tactual characteristic enabling the at least one key of the second group to be tactually distinguishable from the keys of the first group.

2. The electronic device of claim 1 wherein the first material has a first coefficient of thermal conductivity, and wherein the second material has a second coefficient of thermal conductivity different than the first coefficient of thermal conductivity.

3. The electronic device of claim 2 wherein one of the at least portion of the first key portion and the at least portion of the second key portion is formed of a material that is at least semi-metallic, and wherein the other of the at least portion of the first key portion and the at least portion of the second key portion is formed of a material that is nonmetallic.

4. The electronic device of claim 2 wherein the at least portion of the first key portion and the at least portion of the second key portion are formed of materials that are at least semi-metallic but that have a metallic content different than one another.

5. The electronic device of claim 1 wherein the first material has a first coefficient of friction, and wherein the second material has a second coefficient of friction different than the first coefficient of friction.

6. The electronic device of claim 1 wherein the number of keys comprise a plurality of keys disposed closely adjacent one another with substantially no space therebetween.

7. The electronic device of claim 6 wherein at least a portion of the first surface portion of one key is disposed adjacent at least a portion of the second surface portion of another key.

8. The electronic device of claim 1 wherein one of the first surface portion and the second surface portion at least partially surrounds the other of the first surface portion and the second surface portion.

9. The electronic device of claim 1 wherein the outer surface is substantially planar.

10. An electronic device comprising a number of keys, at least some of the keys each comprising:
    a key body comprising a first key portion, a second key portion, and an outer surface;
    the first key portion having a first surface portion;
    the second key portion having a second surface portion, the second surface portion being substantially flush with the first surface portion;
    the outer surface comprising the first surface portion and the second surface portion; and
    for a pair of adjacent keys, a first key of the pair of adjacent keys having its first surface portion characterized by a first key first texture and its second surface portion characterized by a first key second texture, a second key of the pair of adjacent keys having its first surface portion characterized by a second key first texture and its second surface portion characterized by a second key second texture, the second key first texture and the second key second texture enabling the second key of the pair of adjacent keys to be tactually distinguishable from the first key of the pair of adjacent keys.

11. The electronic device of claim 10 wherein one of the first key first texture and the first key second texture is relatively smooth, the other of the first key first texture and the first key second texture being relatively rough.

12. The electronic device of claim 10 wherein the first key first surface portion has a first coefficient of friction, and wherein the first key second surface portion has a second coefficient of friction different than the first coefficient of friction.

13. The electronic device of claim 10 wherein at least a portion of the first key portion of the first key is formed of a first material, and wherein at least a portion of the second key portion of the first key is formed of a second material different than the first material.

14. The electronic device of claim 10 wherein the number of keys comprise a plurality of keys disposed closely adjacent one another with substantially no space therebetween.

15. The electronic device of claim 14 wherein at least a portion of the first key first surface portion is disposed adjacent at least a portion of the second key second surface portion of another key.

16. The electronic device of claim 10 wherein one of the first surface portion and the second surface portion at least partially surrounds the other of the first surface portion and the second surface portion.

17. The electronic device of claim 10 wherein the outer surface is substantially planar.

18. An electronic device comprising a number of keys, at least some of the keys each comprising:

a key body comprising a first key portion, a second key portion, and an outer surface;

the first key portion having a first surface portion;

the second key portion having a second surface portion;

the outer surface comprising the first surface portion and the second surface portion, the first surface portion being substantially flush with the second surface portion;

for a pair of keys of the at least some keys, a first key of the pair of keys having its first surface portion characterized by a first key first coefficient of friction and its second surface portion characterized by a first key second coefficient of friction, a second key of the pair of keys having its first surface portion characterized by a second key first coefficient of friction and its second surface portion characterized by a second key second coefficient of friction, the second key first coefficient of friction and the second key second coefficient of friction enabling the second key of the pair of keys to be tactually distinguishable from the first key of the pair of keys.

19. The electronic device of claim 18 wherein the number of keys comprise a plurality of keys disposed closely adjacent one another with substantially no space therebetween.

20. The electronic device of claim 19 wherein at least a portion of the first surface portion of the first key of the pair of keys is disposed adjacent at least a portion of the second surface portion of the second key of the pair of keys.

21. The electronic device of claim 18 wherein one of the first surface portion and the second surface portion of the first key of the pair of keys at least partially surrounds the other of the first surface portion and the second surface portion of the first key of the pair of keys.

22. The electronic device of claim 18 wherein the outer surface is substantially planar.

* * * * *